(12) United States Patent
Feenstra et al.

(10) Patent No.: US 7,187,344 B2
(45) Date of Patent: Mar. 6, 2007

(54) 2D/3D DISPLAY APPARATUS

(75) Inventors: Bokke Johannes Feenstra, Eindhoven (NL); Menno Willem Jose Prins, Eindhoven (NL); Gerjan Franciscus Arthur Van De Walle, Eindhoven (NL); Henricus Franciscus Johannus Jacobus Van Tongeren, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 422 days.

(21) Appl. No.: 10/267,083

(22) Filed: Oct. 8, 2002

(65) Prior Publication Data
US 2003/0085850 A1 May 8, 2003

(30) Foreign Application Priority Data
Oct. 11, 2001 (EP) .................... 01203854

(51) Int. Cl.
*G09G 3/34* (2006.01)
*G02B 27/22* (2006.01)

(52) U.S. Cl. ................ 345/6; 345/84; 345/107; 359/462; 359/463

(58) Field of Classification Search ............... 349/95, 349/107; 359/228, 272, 22, 456, 462–463; 345/82–107, 6; 348/51
See application file for complete search history.

(56) References Cited

U.S. PATENT DOCUMENTS

| 5,521,724 | A | * | 5/1996 | Shires ...................... 359/22 |
| 5,548,349 | A | * | 8/1996 | Mizuguchi et al. ......... 359/456 |
| 5,956,005 | A | * | 9/1999 | Sheridan .................... 345/107 |
| 6,064,424 | A | * | 5/2000 | van Berkel et al. .......... 348/51 |
| 6,069,650 | A | | 5/2000 | Battersby ..................... 348/59 |
| 6,603,444 | B1 | * | 8/2003 | Kawanami et al. ........ 345/107 |
| 6,700,556 | B2 | * | 3/2004 | Richley et al. ............... 345/84 |
| 2002/0036825 | A1 | * | 3/2002 | Lipton et al. ............... 359/463 |
| 2003/0112491 | A1 | * | 6/2003 | Albert et al. ................ 345/107 |
| 2005/0285835 | A1 | * | 12/2005 | Jessop .......................... 345/89 |

FOREIGN PATENT DOCUMENTS

DE    10025226 A    11/2001

OTHER PUBLICATIONS

Patent Abstracts of Japan, Imai Masao: "Stereoscopic Display Device" Publication No. 08068961, Dec. 3, 1996, Application No. 06203376, Aug. 29, 1994.

* cited by examiner

*Primary Examiner*—Bipin Shalwala
*Assistant Examiner*—David L. Lewis

(57) ABSTRACT

Switching between 2D and 3D visualization is achieved by an optical-index matching fluid (9) which can be brought between a lenticular sheet (6, 7) and a top plate (10). The fluid may contain two immiscible fluids while switching is based on (re)distribution of the fluids due to electrostatic forces.

20 Claims, 2 Drawing Sheets

2D/3D DISPLAY APPARATUS

The invention relates to a display apparatus provided with a display device for displaying images comprising pixels and further provided with means for switching between different types of images originating from the pixels.

The different types of images between which switching takes place are usually a two-dimensional image and a three-dimensional image. Said display apparatus is then suitable, for example, for a plurality of applications, for example, for displaying (moving) stereo images, on the one hand, and graphic text, on the other hand.

The display device for generating the images may be a liquid crystal display device, but also another suitable display device, for example, a device based on electroluminescence or switchable mirrors.

A display device of this type is shown in U.S. Pat. No. 6,069,650. In this document, a liquid crystal material is described which is present between a flat substrate and a substrate provided with elements having a lens action, in this case lens-shaped elements (referred to as lenticular sheet) and is switched between two states. In one state, the liquid crystal material has a refractive index which is substantially equal to that of the material of the lenticular sheet, and the information for both eyes is the same (two-dimensional image). In the other state, the liquid crystal material has a refractive index which is different from that of the material of the lenticular sheet. Also by suitable drive of the pixels, the information is now different for both eyes (three-dimensional image).

With a suitable liquid crystal material (having a small temperature dependence, the difference of refractive index between the two states is such (of the order of 0.2) that the elements, which are lens-shaped in this case, require a large curvature so that the layer of liquid crystal material shows differences of thickness and, consequently, an uneven switching behavior.

Moreover, the liquid crystal material is anisotropic. This means that, for light passed through the liquid, the difference of refractive index between the ordinary and the extraordinary refractive index is not the same in all directions. Consequently, the behavior of the display device, if optimized for one viewing angle, will be poorer for other viewing angles (angle dependence).

It is, inter alia, an object of the present invention to eliminate said drawbacks as much as possible. In accordance with a first embodiment of the invention, the means for switching between the different types of images therefore comprise at least one reservoir which is provided with elements having a lens action at the area of a wall of the reservoir and is also provided with means for filling, at the area of the elements having a lens action, the reservoir between the wall provided with elements having a lens action and a facing transparent wall with a fluid having a refractive index which is substantially identical to that of the elements having a lens action.

Since an isotropic medium is present in this case, both in the presence and absence of the fluid between the flat substrate and the substrate provided with elements having a lens action, said angle dependence is now negligible. Moreover, the difference of refractive index between a suitable fluid and air is usually larger than said 0.2 (in a typical example about 0.48) so that a smaller thickness of the lenticular sheet is sufficient.

The light-transmissive part will neither require any (ITO) electrodes or coatings so that the transmission is enhanced.

In a second embodiment of the invention, the means for switching between the different types of images comprise at least one reservoir which is provided with elements having a lens action at the area of a wall of the reservoir, and the reservoir contains at least two substantially immiscible fluids having a different refractive index as well as a difference of electrical conductivity, while the display device is also provided with drive means for displacing the fluids with respect to each other. The reservoir may be limited to one pixel in this case, but it may be alternatively common for a plurality of pixels.

These and other aspects of the invention are apparent from and will be elucidated with reference to the embodiments described hereinafter.

In the drawings:

FIG. 1 is a cross-section of a display device according to the invention, while

The Figures are diagrammatic and not drawn to scale; corresponding parts are generally denoted by the same reference numerals.

Figure 1:
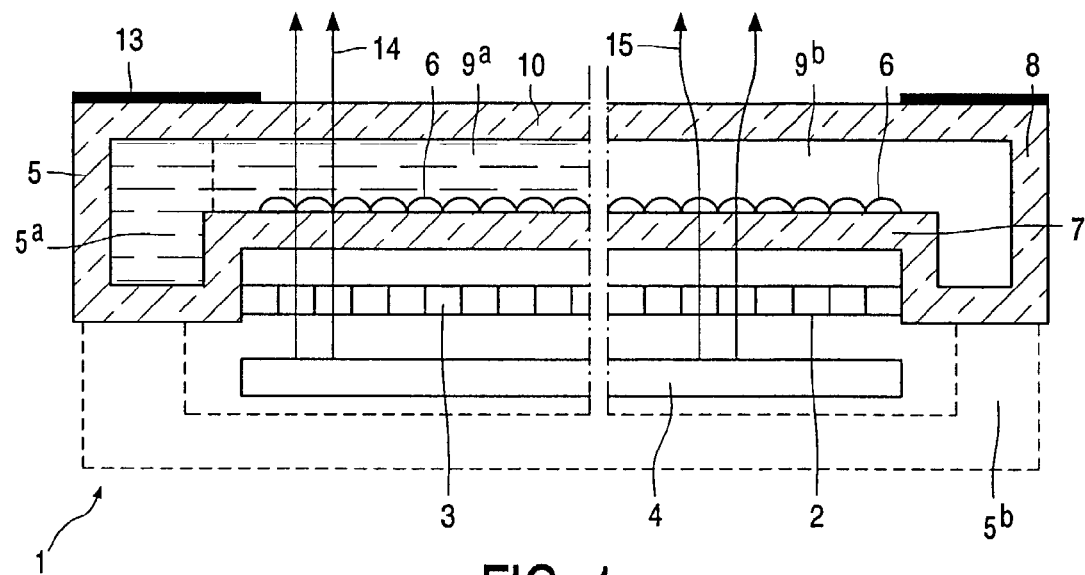

FIG. 1 is a diagrammatic cross-section of a part of a display device 1 with a liquid crystal panel 2 comprising a plurality of pixels 3. The display device is customarily provided with a (flat) light source or backlight 4. For the sake of simplicity, only the pixels 3 and the backlight 4 are shown. Substrates and other possible elements such as polarizers, retardation foils, etc. are not shown in FIG. 1.

The device of FIG. 1 further comprises a reservoir 5 which is provided with transparent elements having a lens action 6 at the area of a transparent wall 7 of the reservoir 5. The reservoir 5 further has a transparent wall 10 facing the wall 7. In this example, the reservoir 5 is sealed with an extra portion $5^a$. This extra portion $5^a$ does not belong to the actual pixel and is preferably covered with a black mask 13.

The reservoir 5 of, for example, glass is adapted in such a way that it can switch between a first state, in which the reservoir between the wall 7 and the transparent wall 10 is completely filled with a fluid having a refractive index which is substantially identical to that of the lens-shaped elements, and a second state in which there is no fluid 9 between the wall 7 and the transparent wall 10. The first state is shown in the left-hand part of FIG. 1, in which the space between the walls 6, 10 is filled with a salt solution $9^a$, in this example a mixture of 30% by weight of water and 70% by weight of cesium metatungstate. This mixture has an isotropic refractive index of approximately 1,486 which is substantially equal to that of the lens system used which, in this example, consists of an UV-tempered polymer acrylate. Other metatungstates may be alternatively used such as, for example, ammonia metatungstate, or other suitable salt solutions.

In this state, light coming from the backlight 4 is substantially not refracted by the lens-shaped elements 6, as is indicated by arrows 14 in FIG. 1.

The second state is shown in the right-hand part of FIG. 1, in which the space between the walls 6, 10 is filled with air, which is denoted by reference numeral $9^b$, having an isotropic refractive index of approximately 1. In this state, light coming from the backlight 4 is refracted by the lens-shaped elements 6, as is indicated by arrows 15 in FIG. 1.

The difference in both states is thus determined by the absence or presence of the fluid $9^a$ between the wall 7 and the wall 10. The presence or absence may be realized, for example, by means of pumping. Electronic pumping is suitable in this respect, while an alternative possibility is electrowetting, notably when small surfaces are concerned. Pumping may be accelerated by using, instead of air, a liquid having a low refractive index.

Figure 2A:
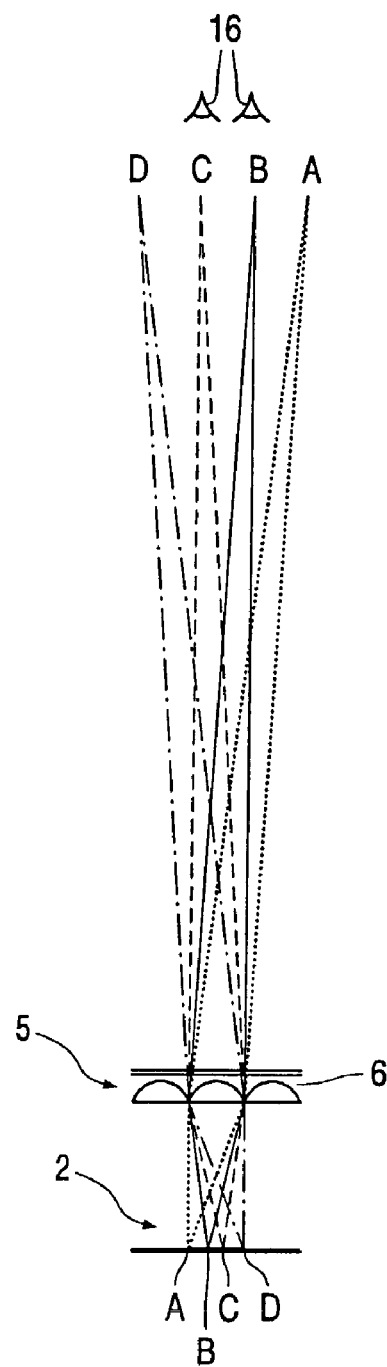
FIG. 2 shows a typical application.
Figure 2B:
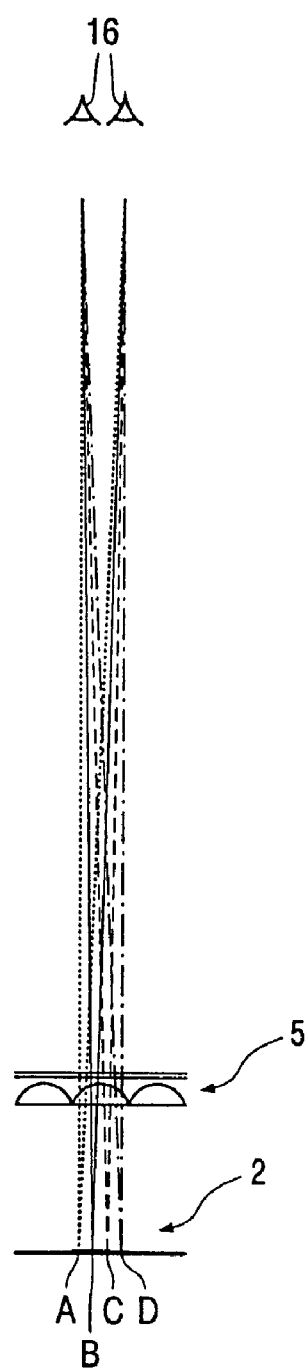

FIG. 2 shows how the display device 1 of FIG. 1 can be used. In this Figure, a part of a panel 2 is shown with a part of a reservoir 5 which is provided with lens-shaped elements 6 and has some typical light paths associated with pixels (or columns of pixels) A, B, C, D. FIG. 2A is related to the situation of the second state described above, in which light from each pixel (or columns of pixels) A, B, C, D is refracted in a different way by the lens-shaped element 6 (denoted by dotted lines, solid lines, broken lines and dot-and-dash lines, respectively). Due to the lens action of the lens-shaped elements 6, the light from the pixels (or columns of pixels) A, B, C, D is deflected in different directions and a viewer sees light coming from different pixels with different eyes (stereo image). In FIG. 2B, related to the situation of the first state described above, the lens action is eliminated and the viewer sees all pixels (columns of pixels) A, B, C, D with each eye.

If necessary, the fluid $9^a$ may also be pumped partly between the wall 7 and the wall 10, for example, when simultaneously displaying text and a stereo image on a panel.

The protective scope of the invention is not limited to the embodiments described. For example, instead of a liquid crystal display device it is alternatively possible to use other suitable display devices based on, for example, electroluminescence or switchable mirrors. Several variations are also possible for the implementation of the elements having a lens action.

Figure 3:
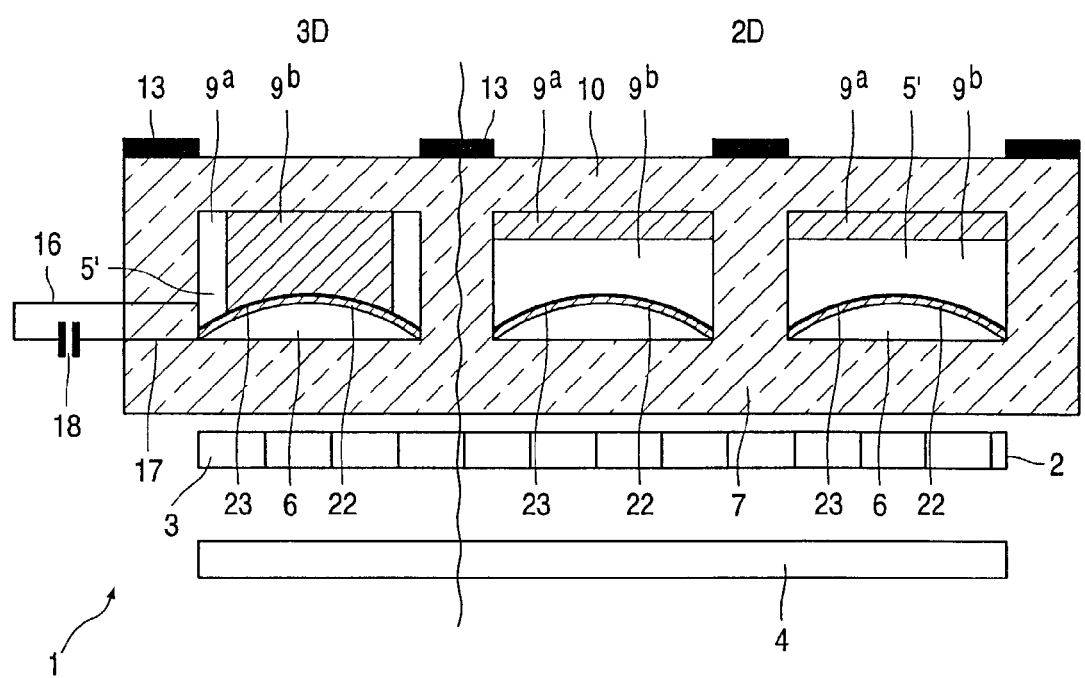
FIG. 3 shows a variant of FIG. 1.

Finally, the variant of FIG. 3 shows a display device with a plurality of sub-reservoirs 5' containing, in a transparent, for example, glass or plastic envelope, two liquids or fluids $9^a$, $9^b$ (with isotropic refractive indices of about 1.486 and about 1.3), which do not mix with each other and one of which is electrically conducting and the other is insulating. In this example, the sub-reservoirs contain, for example, an aqueous solution $9^a$ (electrically conducting) of, for example, a metatungstate, whereas a non-polar oil such as an alcane (for example, dodecane or hexadecane), a silicon oil, chloronaphthalene, bromonaphtalene or 1-bromododecane is chosen as an insulating fluid.

If necessary, the fluids $9^a$, $9^b$ can change places within the glass or plastic envelope.

For the purpose of electrically switching between two states (two and three-dimensional, denoted by 2D and 3D in FIG. 3), each sub-reservoir comprises an electrode 16, coupled to the electrically conducting fluid, and a further electrode 17, coupled to a transparent (ITO) electrode 22 which is coated with a hydrophobic coating 23. Via the electrodes 16, 17, individual pixels or a plurality of pixels are jointly provided with voltages (via a potential V of a voltage source 18 shown diagrammatically). Although the electrodes are shown outside the reservoir for the purpose of understanding the invention, they are provided within the reservoir in practice and insulated from the fluids by means of an insulating coating having a low wetting hysteresis such as a fluoropolymer. The other reference numerals have the same significance as in the previous embodiment.

The electrically conducting fluid is attracted by electrostatic forces on the electrodes. The electrostatic forces determine the mutual position of the fluids. By changing the potential V, the location of the fluids can thus be influenced. The potential may also be provided on the conducting liquid via capacitive coupling.

Dependent on providing or not providing the potential V, the interface between the fluids in FIG. 3 is substantially parallel to the upper and lower wall of the sub-reservoir (2D image, there is no refraction at one of the interfaces) or (in this embodiment) substantially parallel to the side walls (3D image, there is refraction at the interfaces between the lens-shaped element 6 and the fluid $9^b$).

In this embodiment, the electrode 6 is only shown on the lower side of the pixel because this is favorable when joining a plurality of pixels on one substrate, for example, in a matrix display device. In other cases, it is advantageous to provide the electrode 6 also along the wall of the reservoir 13. This is diagrammatically shown by way of broken lines in FIG. 3.

Instead of the lens-shaped elements 6, other elements having a lens action may be alternatively used such as, for example, a graded index lens or a Fresnel structure.

The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

The invention claimed is:

1. A display apparatus, comprising:
   a display device for displaying images comprising pixels; and
   means for switching between different types of images coming from the pixels, wherein the means for switching between the different types of images comprise at least one reservoir which is provided with elements having a lens action at the area of a wall of the reservoir and is also provided with means for filling, at the area of the elements having a lens action, the reservoir between the wall provided with elements having a lens action and a facing transparent wall with a fluid having a refractive index which is substantially identical to that of the elements having a lens action,
   wherein a pitch of the elements having the lens action is larger than that of the pixels, and
   wherein the fluid comprises a metatungetate.

2. A display apparatus as claimed in claim 1, wherein the switching means switch the display device between a stereoscopic image and a plane image.

3. A display apparatus provided with a display device for displaying images comprising pixels and further provided with means for switching between different types of images coming from the pixels, in which the means for switching between the different types of images comprise at least one reservoir which is provided with elements having a lens action at the area of a wall of the reservoir, and the reservoir contains at least two substantially immiscible fluids having a different refractive index as well as a difference of electrical conductivity, said display device being also provided with drive means for displacing the fluids with respect to each other.

4. A display apparatus as claimed in claim 3, wherein the switching means switch the display device between a stereoscopic image and a plane image.

5. A display apparatus as claimed in claim 3, with two immiscible fluids having a different refractive index, one of which is electrically conducting and one of which is substantially insulating.

6. A display apparatus as claimed in claim 3, wherein the drive means comprise at least two electrodes at the area of the wall of the reservoir, which electrodes can be electrically coupled to the fluids.

7. The display apparatus of claim 6, wherein the electrodes are each provided with a fluoropolymer insulating coating.

8. The display apparatus of claim 3, further comprising optically transparent electrodes disposed on the elements having a lens action.

9. The display apparatus of claim 8, further comprising a hydrophobic coating on the transparent electrodes.

10. The display apparatus of claim 3, wherein a first one of the two fluids comprises a metatungstate.

11. The display apparatus of claim 10, wherein a second one of the two fluids comprises a non-polar oil.

12. The display apparatus of claim 3, wherein a pitch of the elements having the lens action is larger than a pitch of the pixels.

13. A display apparatus comprising:
   a display device for displaying images comprising pixels; and
   means for switching between different types of images coming from the pixels,
   wherein the means for switching between the different types of images comprises a plurality of reservoirs, each reservoir having,
      an element having a lens action, disposed on first wall of the reservoir,
      at least two substantially immiscible fluids having a different refractive index as well as a difference of electrical conductivity, the two fluids both being disposed between the element having the lens action and a second wall of the reservoir opposite the first wall, and
   drive means for displacing the fluids with respect to each other.

14. The display apparatus of claim 13, wherein the switching means switch the display device between a stereoscopic image and a plane image.

15. The display apparatus of claim 13, with two immiscible fluids having a different refractive index, one of which is electrically conducting and one of which Is substantially insulating.

16. The display apparatus of claim 13, wherein the drive means comprise at least two electrodes at the area of the wall of the reservoir, which electrodes can be electrically coupled to the fluids.

17. The display apparatus of claim 13, wherein a first one of the two fluids comprises a metatungstate.

18. The display apparatus of claim 13, wherein a pitch of the elements having the lens action is larger than a pitch of the pixels.

19. The display apparatus of claim 13, wherein the element having the lens action comprises a polymer acrylate.

20. The display apparatus of claim 13, wherein the drive means comprises a transparent electrode disposed in the reservoir on the element having the lens action.

* * * * *